United States Patent
Reddy et al.

(10) Patent No.: US 6,442,554 B1
(45) Date of Patent: Aug. 27, 2002

(54) SYSTEM AND METHOD FOR GENERATING DEPENDENT DATA

(75) Inventors: Venugopal P. Reddy, Madison; Usha B. Iyer, Randolph; Daniel J. Folmar, Denville; Milind S. Gupte, Long Valley, all of NJ (US)

(73) Assignee: i2 Technologies US, Inc., Dallas, TX (US)

( * ) Notice: Subject to any disclaimer, the term of this patent is extended or adjusted under 35 U.S.C. 154(b) by 0 days.

(21) Appl. No.: 09/241,361

(22) Filed: Jan. 29, 1999

(51) Int. Cl.$^7$ .............................................. G06F 17/30
(52) U.S. Cl. ................... 707/100; 707/2; 707/3
(58) Field of Search ................ 707/1–10, 100–104, 707/200–206, 104.1, 2–4; 345/433, 356, 355, 853, 440; 358/444

(56) References Cited

U.S. PATENT DOCUMENTS

| | | | | |
|---|---|---|---|---|
| 5,359,724 A | * | 10/1994 | Earle | 707/205 |
| 5,406,477 A | * | 4/1995 | Harben | 364/401 |
| 5,502,576 A | * | 3/1996 | Ramsay et al. | 358/444 |
| 5,796,932 A | * | 8/1998 | Fox et al. | 707/104.1 |
| 5,799,295 A | | 8/1998 | Nagai | 706/46 |
| 5,861,885 A | * | 1/1999 | Strasnick et al. | 345/355 |
| 5,918,232 A | * | 6/1999 | Pouschine et al. | 707/103 |
| 5,991,754 A | * | 11/1999 | Raitto et al. | 707/2 |
| 6,034,697 A | * | 3/2000 | Becker | 345/433 |
| 6,111,578 A | * | 8/2000 | Tesler | 345/356 |
| 6,161,103 A | * | 12/2000 | Rauer et al. | 707/4 |
| 6,163,774 A | * | 12/2000 | Lore et al. | 707/2 |
| 6,205,447 B1 | * | 3/2001 | Malloy | 707/102 |
| 6,212,515 B1 | * | 4/2001 | Rogers | 707/10 |

FOREIGN PATENT DOCUMENTS

EP 0742524 A2 11/1996 ............ G06F/17/30

OTHER PUBLICATIONS

International Search Report, Jun. 7, 2000.
Brown, Bulkley, "Database Marketing and Business Geographics," XP–002070806, Proceedings of the Annual SAS Users Group International Conference, SUGI, XX, XX, vol. 1, pp. 830–835, Jan. 1, 1996.
R.V. Mallya, "Adaptation of Bill of Materials for Custom Built Products," XP–000746860, Omega, GB, Pergamon Press, Oxford, vol. 9, No. 2, pp. 207–208, Jan. 1, 1981.
i2 Technologies, "Demand Planning Solutions," http://www.i2.com/html/i2_solutions_for_demand_planning-.html, 3 pages, Dec. 28, 1998.

\* cited by examiner

Primary Examiner—Jack Choules
Assistant Examiner—Ella Colbert
(74) Attorney, Agent, or Firm—Baker Botts L.L.P.

(57) ABSTRACT

A system (10) for generating dependent data (132) includes a database (16) having at least a first dimension (50, 70, 122). The database (16) contains a mapping (106) comprising a source member (54) in the first dimension (50, 70, 122) and a target member (54) in the first dimension (50, 70, 122). The database (16) also contains an attach rate (120) that relates independent data (112) associated with the source member (54) to dependent data (132) associated with the target member (54). A server (12) coupled to the database (16) accesses the mapping (106) and applies the attach rate (120) to the independent data (112) for the source member (54) to generate the dependent data (132) for the target member (54).

30 Claims, 8 Drawing Sheets

110

| ATTACH RATE DATA MEASURE ||||||
|---|---|---|---|---|---|
| SOURCE | TARGET | GEOGRAPHY | TIME INTERVALS |||
| | | | WEEK 1 | WEEK 2 | ... |
| 32MB  54 | 6GB  54 | NE  74 | 0.1  120 | 0.6  120 | ... |
| 48MB  54 | 6GB  54 | NE  74 | 0.7  120 | 0.5  120 | ... |
| ... | ... | ... | ... | ... | ... |
| HOME  54 | 233MHz  54 | SE  74 | 0.4  120 | 0.5  120 | ... |
| STUDENT 54 | 233MHz  54 | SE  74 | 0.6  120 | 0.5  120 | ... |
| ... | ... | ... | ... | ... | ... |

| MAPPING SET 1 | |
|---|---|
| SOURCE | TARGET |
| 32MB  54 | 6GB  54 |
| 48MB  54 | 6GB  54 |
| 32MB  54 | 4GB  54 |
| 48MB  54 | 4GB  54 |
| HOME  54 | 233MHz  54 |
| STUDENT  54 | 233MHz  54 |
| HOME  54 | 300MHz  54 |
| STUDENT  54 | 300MHz  54 |
| ... | ... |

| ATTACH RATE DATA MEASURE | | | | | |
|---|---|---|---|---|---|
| SOURCE | TARGET | GEOGRAPHY | TIME INTERVALS | | |
| | | | WEEK 1 | WEEK 2 | ... |
| 32MB  54 | 6GB  54 | NE  74 | 0.1  120 | 0.6  120 | ... |
| 48MB  54 | 6GB  54 | NE  74 | 0.7  120 | 0.5  120 | ... |
| ... | ... | ... | ... | ... | ... |
| HOME  54 | 233MHz  54 | SE  74 | 0.4  120 | 0.5  120 | ... |
| STUDENT  54 | 233MHz  54 | SE  74 | 0.6  120 | 0.5  120 | ... |
| ... | ... | ... | ... | ... | ... |

| INDENDENT DATA MEASURE ||||| 
|---|---|---|---|---|
| SOURCE | GEOGRAPHY | TIME INTERVALS ||| 
| | | WEEK 1 | WEEK 2 | ... |
| 32MB  54 | NE  74 | 1000 112 | 2000 112 | ... |
| 48MB  54 | NE  74 | 1500 112 | 500 112 | ... |
| ... | ... | ... | ... | ... |
| HOME  54 | SE  74 | 200 112 | 300 112 | ... |
| STUDENT 54 | SE  74 | 500 112 | 700 112 | ... |
| ... | ... | ... | ... | ... |

| DEPENDENT DATA EXPRESSION |
|---|
| DEPENDENT DATA FORECAST = INDEPENDENT DATA FORECAST * ATTACH RATE |

| SOURCE | TARGET | WEEK 1 | | | WEEK 2 | | | ... |
|---|---|---|---|---|---|---|---|---|
| | | INDEPENDENT FORECAST | ATTACH RATE | DEPENDENT FORECAST | INDEPENDENT FORECAST | ATTACH RATE | DEPENDENT FORECAST | |
| 32MB 54 | — | 1000 112 | — | — | 2000 112 | — | — | ... |
| — | 6GB 54 | — | 0.1 120 | 100 132 | — | 0.6 120 | 1200 132 | ... |
| — | 4GB 54 | — | 0.9 120 | 900 132 | — | 0.4 120 | 800 132 | ... |
| 48MB 54 | — | 1500 112 | — | — | 500 112 | — | — | ... |
| — | 6GB 54 | — | 0.7 120 | 1050 132 | — | 0.5 120 | 250 132 | ... |
| — | 4GB 54 | — | 0.3 120 | 450 132 | — | 0.5 120 | 250 132 | ... |
| ... | ... | ... | ... | ... | ... | ... | ... | ... |
| HOME 54 | — | 2000 112 | — | — | 300 112 | — | — | ... |
| — | 233MHz 54 | — | 0.4 120 | 80 132 | — | 0.5 120 | 150 132 | ... |
| — | 300MHz 54 | — | 0.6 120 | 120 132 | — | 0.5 120 | 150 132 | ... |
| STUDENT 54 | — | 500 112 | — | — | 700 112 | — | — | ... |
| — | 233MHz 54 | — | 0.6 120 | 300 132 | — | 0.5 120 | 350 132 | ... |
| — | 300MHz 54 | — | 0.4 120 | 200 132 | — | 0.5 120 | 350 132 | ... |
| ... | ... | ... | ... | ... | ... | ... | ... | ... |

| TARGET | SOURCE | WEEK 1 | | | WEEK 2 | | | ... |
|---|---|---|---|---|---|---|---|---|
| | | INDEPENDENT FORECAST | ATTACH RATE | DEPENDENT FORECAST | INDEPENDENT FORECAST | ATTACH RATE | DEPENDENT FORECAST | |
| 6GB  54 | — | — | — | — | — | — | — | ⋮ |
| | 32MB  54 | 1000  112 | 0.1  120 | 100  132 | 2000  112 | 0.6  120 | 1200  132 | ⋮ |
| | 48MB  54 | 1500  112 | 0.7  120 | 1050  132 | 500  112 | 0.5  120 | 250  132 | ⋮ |
| | SUM  158 | — | — | 1150  132 | — | — | 1450  132 | ⋮ |
| 4GB  54 | — | — | — | — | — | — | — | ⋮ |
| | 32MB  54 | 1000  112 | 0.9  120 | 900  132 | 2000  112 | 0.4  120 | 800  132 | ⋮ |
| | 48MB  54 | 1500  112 | 0.3  120 | 450  132 | 500  112 | 0.5  120 | 250  132 | ⋮ |
| | SUM  158 | — | — | 1350  132 | — | — | 1050  132 | ⋮ |
| ⋮ | ⋮ | ⋮ | ⋮ | ⋮ | ⋮ | ⋮ | ⋮ | ⋮ |
| 233MHz  54 | — | — | — | — | — | — | — | ⋮ |
| | HOME  54 | 200  112 | 0.4  120 | 80  132 | 300  112 | 0.5  120 | 150  132 | ⋮ |
| | STUDENT  54 | 500  112 | 0.6  120 | 300  132 | 700  112 | 0.5  120 | 350  132 | ⋮ |
| | SUM  158 | — | — | 380  152 | — | — | 500  152 | ⋮ |
| 300MHz  54 | — | — | — | — | — | — | — | ⋮ |
| | HOME  54 | 200  112 | 0.6  120 | 120  132 | 300  112 | 0.5  120 | 150  132 | ⋮ |
| | STUDENT  54 | 500  112 | 0.4  120 | 200  132 | 700  112 | 0.5  120 | 350  132 | ⋮ |
| | SUM  158 | — | — | 320  152 | — | — | 500  152 | ⋮ |
| ⋮ | ⋮ | ⋮ | ⋮ | ⋮ | ⋮ | ⋮ | ⋮ | ⋮ |

FIG. 10

SYSTEM AND METHOD FOR GENERATING DEPENDENT DATA

TECHNICAL FIELD OF THE INVENTION

This invention relates in general to the field of planning, and more particularly to a system and method for generating dependent data.

BACKGROUND OF THE INVENTION

It is often desirable within a business or other planning environment to generate information regarding demand, available supply, selling price, or other data concerning a product or other item. Data for products may often be dependent in some manner on data for other hierarchically related products. For example, demand for a product with multiple components or options may drive the demand for a particular one of those components or options. It may also be desirable, for example, to relate demand for one or more products to the demand for one or more other products even though the products are not hierarchically related. For example, demand for one component of a product may drive the demand for another component of the product even when the components are not hierarchically related.

As the relationships between products, component, and options proliferate, and as data for these products, components, and options increases in complexity, generating dependent forecasts or other dependent data relatively quickly, efficiently, and reliably becomes increasingly important. However, previous techniques for generating dependent data are deficient for many multi-dimensional applications because such techniques may often involve the complicated manipulation of data measures associated with non-hierarchically related products, resulting in additional delays and associated business costs. Database size requirements, system maintenance concerns, and complexity from the perspective of a user often increase with the number of data measures and the complexity of the relationships between the products associated with these data measures. These deficiencies are particularly troublesome when dependent data to be generated concerns hierarchically unrelated members in a multi-dimensional environment. Furthermore, these and other problems make updating, modifying, and internally synchronizing the dependent data across an enterprise relatively difficult and time consuming even if it is generated substantially accurately. Moreover, since timeliness is often sacrificed as a result of these difficulties, dependent data generated for such hierarchically unrelated members using previous techniques may be too unreliable for the needs of many users. These and other disadvantages make previous techniques for generating dependent data inadequate for many purposes.

SUMMARY OF THE INVENTION

According to the present invention, disadvantages and problems associated with systems and methods for generating dependent data have been substantially reduced or eliminated.

According to one embodiment of the present invention, a system for generating dependent data includes a database having at least a first dimension. The database contains a mapping comprising a source member in the first dimension and a target member in the first dimension. The database also contains an attach rate that relates independent data associated with the source member to dependent data associated with the target member. A server coupled to the database accesses the mapping and applies the attach rate to the independent data for the source member to generate the dependent data for the target member. In a particular embodiment, the first dimension is a product dimension, the database contains members in the geography and time dimensions, and the attach rate relates the independent data to the dependent data given the members in the geography and time dimensions.

The system and method of the present invention provide a number of important technical advantages. Unlike previous techniques, the system and method of the present invention generate dependent data for target members relatively quickly, efficiently, and reliably, decreasing delays and reducing unnecessary business costs. These benefits are particularly apparent when the dependent data to be generated concerns hierarchically unrelated source and target members, which mappings and corresponding attach rates readily accommodate. Furthermore, the system and method of the present invention reduce the need for human intervention and allow dependent data to be readily updated, modified, and internally synchronized across an enterprise. In addition, the attach rates accommodate stochastic or other time dependent data, which allows dependent data to be generated using the present invention when other techniques would be deficient. Other important technical advantages are apparent to those skilled in the art from the following figures, description, and claims.

BRIEF DESCRIPTION OF THE DRAWINGS

To provide a more complete understanding of the present invention and further features and advantages thereof, reference is now made to the following description taken in conjunction with the accompanying drawings, in which.

DETAILED DESCRIPTION OF THE INVENTION

Figure 1:
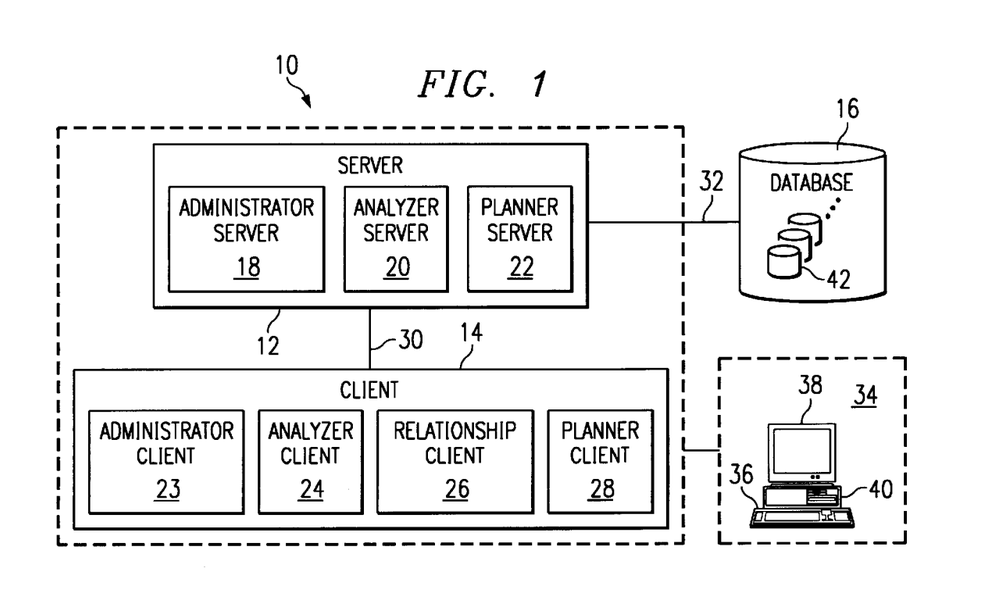
FIG. 1 illustrates an exemplary system for generating dependent data in accordance with the present invention.

FIG. 1 illustrates an exemplary system 10 for generating dependent data within a business or other planning environment. In general, a dependent data forecast provides an estimate of the forecasted demand, available supply, selling price, or other quantifiable data measure associated with a target product or other target item as a function of the forecasted demand, available supply, selling price, or other quantifiable data measure, respectively, associated with one or more related source products or other source items.

Although source and target items are typically referred to throughout this application as being products, the present invention contemplates system 10 generating dependent data for appropriate tangible or non-tangible items other than products, including but not limited to services or other benefits, according to particular needs. Furthermore, although forecasts are primarily discussed herein, the present invention is similarly applicable to generating historical or other data, separately or in combination with forecast data, according to particular planning needs of an organization, facility, or user. Moreover, although the system and method of the present invention are described primarily in connection with generating dependent demand forecasts for products, those skilled in the art will appreciate that the system and method of the present invention are similarly applicable to generating forecasts for dependent available supply, dependent selling price, and any other suitable dependent data.

Independent forecasts are forecasts derived for source items independently using data concerning the source items themselves. For example, products for which demand forecasts may be determined independently using traditional forecasting techniques and suitable information concerning the products such as historical sales, causal factors, key account input, market intelligence, and the like may be referred to as independent demand products or source products. Typically, source products are available for sale directly to the consumer as a bundled unit and are referenced using assigned product codes such as stock keeping units (SKUs). Exemplary source products might include a desktop computer system (including a central processing unit (CPU), hard drive, memory board, keyboard, monitor, and other components and options of the system) or a bundled mixed pack of school supplies (including markers, pens, pencils, erasers, and other supplies in the mixed pack), either of which might be referenced using an assigned product code and sold directly to the consumer as a single unit. Another exemplary source product might be a 6 GB hard drive that is sold separately from any computer system or a pen sold separately from any mixed pack.

Dependent forecasts are forecasts derived for one or more data measures using forecast information concerning items to which the subject data measures are related using an attach rate data measure. As an example, products for which demand forecasts may be derived as a function of the demand for one or more related source products may be referred to as dependent demand products or target products. Such target products are typically components and options that are bundled with other components and options and made available to the consumer as part of another product that is sold to the consumer as a single unit. Exemplary target products for a computer system might include a CPU, hard drive, memory board, keyboard, and monitor, while target products for a school supply mixed pack source product might include individual markers, pens, pencils, and erasers.

In one embodiment, a particular component might be both a source product, with associated independent demand, and a target product, with associated dependent demand driven by demand for a corresponding source product. For example, a 17 in monitor may be sold together with or, in the alternative, separately from any computer system. The 17 in monitor might in this situation have independent demand based on sales that are separate from any computer system and are not driven by sales of any other products or components. The 17 in monitor might also have dependent demand based on sales of computer systems that include the 17 in monitor and driven by such sales. The present invention contemplates generating dependent data for a target product to aggregate in some manner with independent data derived for the target product.

A particular target product may be a required or optional component of multiple products, such that demand for the target product is a hierarchically related to demand for each of the products of which the target product is a component. A target product may also be a required or optional sub-component that is bundled with other sub-components as part of a more comprehensive component, in which case demand for the component may drive demand for its hierarchically related sub-components. Furthermore, a target product may be a required or optional component for which demand is related to demand for another component, even though the two components are not hierarchically related. As a result of these and other relationships, complicated demand dependencies may exist between source products and target products that make dependent demand forecasting according to previous techniques relatively difficult, time consuming, and unreliable. Those skilled in the art will readily appreciate that dependencies similar to those described above in connection with demand may exist in connection with available supply, selling price, and any other quantifiable data measure associated with products or other items.

In one embodiment, the dependent relationship between the demand for a target product and the demand for a source product is expressed numerically as an attach rate applied to the demand for the source product. An integer attach rate may adequately express the dependent demand relationship between a source product and its required components for which options are not available, since the number of such components required for each source product does not vary in time or does so only relatively rarely, for example, when the source product manufacturer modifies the source product. For example, if a computer system (source product) required two CD-ROM drives (target products), independent demand for the computer system might drive dependent demand for CD-ROM drives with an integer attach rate of two. Similarly, if the computer system required only one CD-ROM drive and an optional second CD-ROM drive was not available to the consumer as an option, independent demand for the computer system might drive dependent demand for CD-ROM drives with an integer attach rate of only one rather than two.

However, a non-integer attach rate may be desirable to express the dependent demand relationship between a source product and its components for which options are available to the consumer, since the number and type of optional components may vary in time in a stochastic manner according to customer needs. For example, if a computer system required only one CD-ROM drive, but a second CD-ROM drive was an option available to the consumer, independent demand for the computer system might drive dependent demand for CD-ROM drives with an attach rate between one and two, according to the percentage of consumers opting to have the second CD-ROM drive included in their computer system. As another example, if a computer system requires a CPU and both 233 MHz CPUs and 300 MHz CPUs are available to the consumer, independent demand for the computer system might drive dependent demand for 233 MHz CPUs with an attach rate between zero and one, according to the percentage of consumers opting to have 233 MHz CPUs. Independent demand for the computer system would also drive dependent demand for 300 MHz CPUs with an attach rate between zero and one, according to the percentage of consumers opting to have 300 MHz CPUs.

Of particular interest with respect to the present invention, a non-integer attach rate may be desirable to reflect the dependent demand relationship between a source product and a hierarchically unrelated target product. For example, demand for 32 MB memory boards (source product) may drive demand for 6 GB hard drives (target product) at a first non-integer attach rate and demand for 4 GB hard drives (target product) at a second non-integer attach rate. These attach rates are for non-hierarchically related products, since neither 6 GB hard drives nor 4 GB hard drives are components of 32 MB memory boards, yet it may still be desirable to generate dependent data for these target products based on independent data for this source product. System 10 allows such dependent data to be readily generated. Those skilled in the art will appreciate that other dependent scenarios may exist and that the present invention is intended to encompass any appropriate dependent demand or other dependent data scenario, whether or not specifically described.

System 10 includes a server 12, a client 14, and a multi-dimensional engine and associated database 16. Server 12 includes an administrator server 18, an analyzer server 20, and a planner server 22. In one embodiment, administrator server 18, analyzer server 20, and planner server 22 are separate processes running on a dedicated server computer, although the present invention contemplates administrator server 18, analyzer server 20, and planner server 22 being wholly or partially integral to one another and running on one or more separate computers. Client 14 includes an administrator client 23, an analyzer client 24, a relationship client 26, and a planner client 28. In one embodiment, administrator client 23, analyzer client 24, relationship client 26, and planner client 28 are separate processes running on a dedicated client computer, although the present invention contemplates administrator client 23, analyzer client 24, relationship client 26, and planner client 28 being wholly or partially integral to one another and running on one or more separate computers. Server 12 and client 14 may be autonomous or may operate subject to input from one or more users.

Database 16 provides persistent data storage for system 10. In one embodiment, database 16 is three-dimensional and, for each data measure, associates with each storage location 42 a particular member from the product dimension, a particular member from the geography dimension, and a particular member from the time dimension. Each of these particular combinations of members of these three dimensions is associated with a corresponding storage location 42 in database 16, similar to each combination of coordinates from the x, y, and z axes being associated with a point in three-dimensional Euclidian space. Furthermore, position within a particular dimension may be changed independent of members of other dimensions, much like the position of a coordinate along the x axis may be changed independent of the positions of other coordinates along the y and z axes in three-dimensional Euclidian space.

The present invention contemplates database 16 having as few or as many dimensions as appropriate for the particular data forecasting application. For example, and not by way of limitation, an organization or facility associated with system 10 may not consider geography in connection with its data forecasting needs. This might be the case when products are ordered using the Internet or the telephone and then distributed from a single distribution point. In this example, database 16 might be two-dimensional rather than three-dimensional and might not reflect positions or members within the geography dimension. Furthermore, the demand or other data might be quantified per specified time interval, in which case database 16 might be two-dimensional and might not reflects positions or members within the time dimension. Other possible scenarios involving more or fewer than three dimensions will be apparent to those skilled in the art. The present invention contemplates database 16 having any number of dimensions appropriate for the needs of the organization or facility associated with system 10.

In the three-dimensional embodiment of the present invention, the values of the data measures within the set for a particular storage location 42 depend on the combined positions of members within product, geography, and time dimensions for that storage location 42. As a result, the values of the data measures typically vary with these combined positions as appropriate to accurately reflect the demand, available supply, selling price, or other data associated with these members. Where system 10 provides a dependent demand forecast, one or more data measures concern a business quantity relating to product demand, such as data concerning product shipping, product inventory, product pricing, or any other suitable data. As discussed more fully below, when a suitable combination of members is specified in the product, geography, and time dimensions according to operation of system 10, database 16 accesses the data measures for storage location 42 associated with that combination of members to assist system 10 in deriving, updating, and internally synchronizing dependent demand forecasts or other suitable dependent data. The present invention contemplates other suitable dimensions to replace or combine with the product, geography, and time dimensions according to particular needs.

In one embodiment, database 16 supports multi-dimensional on-line analytical processing capability and is populated with data measures received from transactional data sources that are internal, external, or both internal and external to the organization or facility associated with system 10. For example, and not by way of limitation, data measures received from sources internal to a manufacturing or warehousing facility may include unit shipping data, dollar shipping data, inventory data, pricing data, and any other suitable information applicable to dependent demand forecasting. Data measures received from external sources, such as from syndicated partners of the organization or facility, may include point-of-sale demographic data and any other suitable information. The present invention contemplates appropriate data measures being stored in database 16 in any suitable manner. Server 12 is coupled to database 16 using link 32, which may be any wireline, wireless, or other link suitable to support data communications between server 12 and database 16 during operation of system 10. Database 16 may be integral to or separate from server 12, may operate on one or more computers, and may store any information suitable to support the operation of system 10 in generating dependent demand forecasts or other dependent data.

Server 12 is coupled to client 14 using link 30, which may be any wireline, wireless, or other link suitable to support communications between server 12, client 14, and the respective processes of server 12 and client 14 during operation of system 10. Although link 30 is shown as generally coupling server 12 to client 14, processes of server 12 may communicate directly with one or more corresponding processes of client 14. In one embodiment, administrator client 23 communicates with administrator server 18, analyzer client 24 communicates with analyzer server 20, and relationship client 26 and planner client 28 communicate with planner server 22. Other communications may exist between processes of server 12 and processes of client 14 without departing from the intended scope of the present invention.

In general, administrator server 18 communicates with administrator client 23 to interact with a user associated with administrator client 23 in managing database 16 and certain activities associated with database 16. In one embodiment, as described more fully below with reference to FIG. 3, administrator server 18 uses appropriate input to define mapping sets that include one or more mappings in the product dimension, each mapping defining a relationship between a source product and a corresponding target product. Administrator server 18 also receives input suitable to define appropriate attach rates, which are instances of an attach rate data measure, that reflect the dependent data relationship between the source and target products of a corresponding mapping, given particular positions within the geography and time dimensions. Administrator server 18 also stores the mapping sets and attach rates in database 16 for use in generating dependent demand forecasts and other dependent data according to the teachings of the present invention.

Analyzer server 20 communicates with analyzer client 24 and allows analyzer client 24 to access some or all of the contents of database 16 for analysis and reporting purposes. In one embodiment, analyzer server 20 provides analyzer client 24 read only access to database 16, such that analyzer client 24 is not permitted to modify contents of database 16.

Planner server 22 communicates with relationship client 26 and planner client 28 to allow client 14 or one or more users associated with client 14 to store information in database 16 and modify contents of database 16 for purposes of generating independent forecasts, dependent forecasts, or other relevant data. As described more fully below, planner server 22 participates in storing and manipulating dependent data expressions defined according to specified independent data measures, operators, and attach rate data measures. Planner server 22 also participates in storing and manipulating aggregate dependent data relationships that are defined using selected mapping sets, dependent data expressions, and aggregation functions. These dependent data expressions and aggregate dependent data relationships are used in generating dependent demand forecasts or other suitable dependent data according to the present invention. Planner server 22 may participate in modifying any appropriate contents of database 16.

System 10 may operate on one or more computers 34 that are integral to or separate from the hardware and software that support server 12, client 14, and database 16. Computer 34 may include a suitable input device 36, such as a keypad, mouse, touch screen, microphone, or other device to input information. An output device 38 may convey information associated with the operation of system 10, including digital or analog data, visual information, or audio information. Computer 34 may include fixed or removable storage media, such as magnetic computer disks, CD-ROM, or other suitable media to receive output from and provide input to system 10. Computer 30 may include a processor 40 and volatile or non-volatile memory to execute instructions and manipulate information according to the operation of system 10. Although only a single computer 34 is shown, server 12, client 14, and database 16 may each operate on separate computers 34 or may operate on one or more shared computers 34 without departing from the intended scope of the present invention.

Figure 2A:
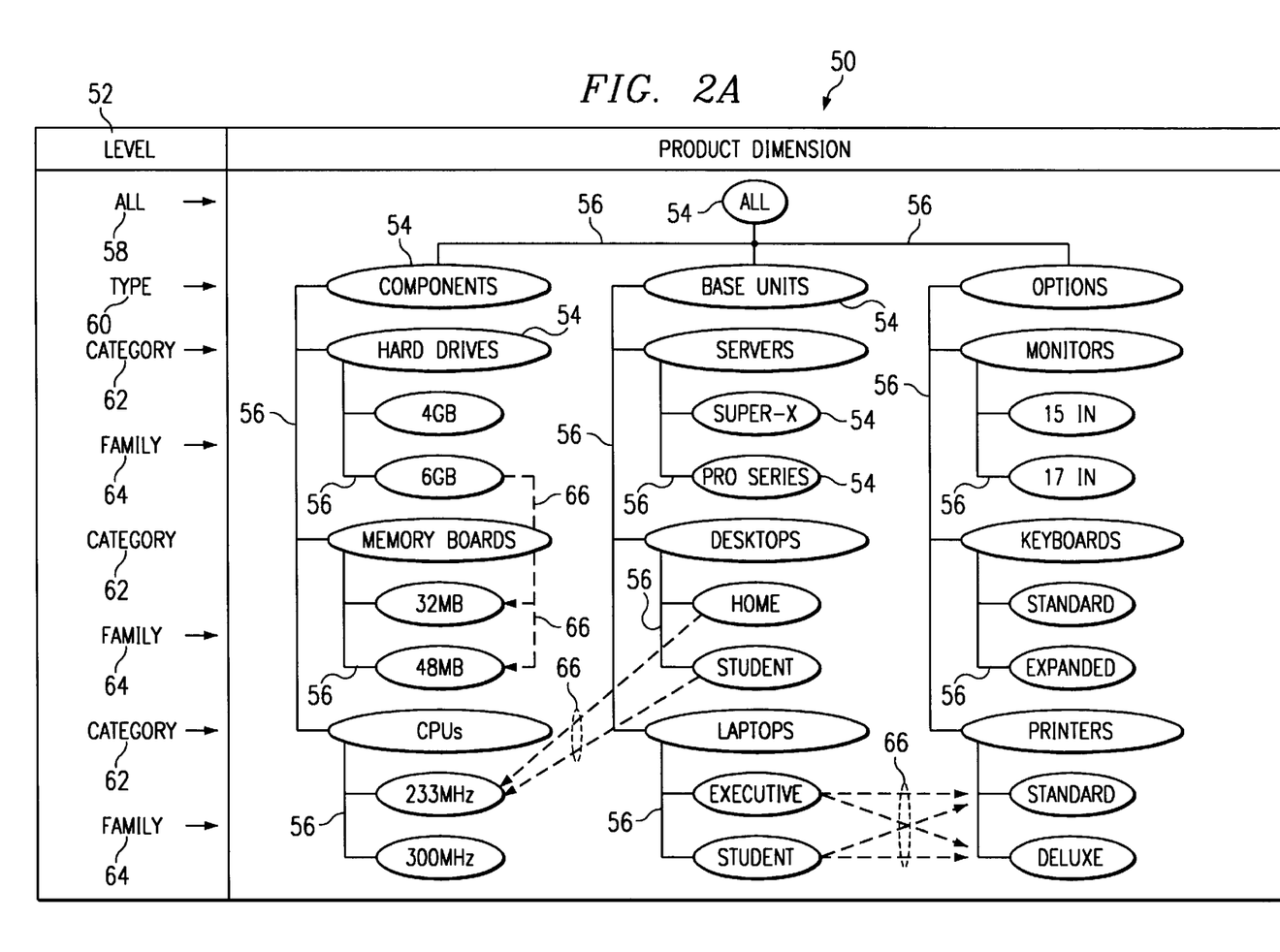
FIGS. 2A and 2B illustrate exemplary product and geography dimensions, respectively.

FIG. 2A illustrates an exemplary product dimension 50 within database 16 that includes a hierarchy of product levels 52 each having one or more members 54. The value of each data measure associated with a member 54 is an aggregation of the values of corresponding data measures associated with hierarchically related members 54 in lower levels 52 of product dimension 50. In an exemplary embodiment in which system 10 provides dependent demand forecasts, the demand associated with a member 54 is the aggregate demand for these hierarchically related members 54. In this embodiment, product levels 52 for product dimension 50 include an all products level 58, a product type level 60, a product category level 62, and a product family level 64. Selected and merely exemplary hierarchical relationships between members 54 are shown using links 56, as described more fully below. Links 56 between hierarchically related members 54 in adjacent levels 52 of product dimension 50 reflect parent-child relationships and are shown as solid lines. Although FIG. 2A is described primarily in connection with demand relationships, the following description is similarly applicable to other data relationships, such as available supply, selling price, or any other suitable relationships relating to data measures associated with an item or set of items.

In the particular example shown in FIG. 2A, all products level 58 contains "All" member 54 representing the aggregate demand for all members 54 in lower levels 60, 62, and 64 of product dimension 50. Product type level 60 contains "Components," "Base Units," and "Options" members 54. "Components" member 54 represents the aggregate demand for hierarchically related members 54 below "Components" member 54 in levels 62 and 64 of product dimension 50. Similarly, "Base Units" member 54 represents the aggregate demand for hierarchically related members 54 below "Base Units" member 54 and "Options" member 54 represents the aggregate demand for hierarchically related members 54 below "Options" member 54. Links 56 between "All" member 54 and "Components," "Base Units," and "Options" members 54 indicate the hierarchical relationships between these members 54.

Product category level 62 contains, under "Components" member 54, "Hard Drives," "Memory Boards," and "CPUs" members 54. "Hard Drives" member 54 represents the aggregate demand for hierarchically related members 54 below "Hard Drives" member 54 in level 64 of product dimension 50. Similarly, "Memory Boards" member 54 represents aggregate demand for hierarchically related members 54 below "Memory Boards" member 54 and "CPUs" member 54 represents the aggregate demand for hierarchically related members 54 below "CPUs" member 54. Links 56 between "Components" member 54 and "Hard Drives," "Memory Boards," and "CPUs" members 54 indicate the hierarchical relationships between these members 54. Analogous links 56 reflect hierarchical relationships between "Base Units" and "Options" members 54 of product type level 60 and corresponding members 54 in lower levels 62 and 64 within product dimension 50.

Product family level 64 contains, under "Hard Drives" member 54, "4 GB" and "6 GB" members 54. Links 56 between "Hard Drives" member 54 and "4 GB" and "6 GB" members 54 indicate hierarchical relationships between these members 54. Analogous links 56 reflect hierarchical relationships between "Memory Boards," "CPUs," "Servers," "Desktops," "Laptops," "Monitors," "Keyboards," and "Printers" members 54 of product category level 62 and corresponding members 54 in lower level 64 within product dimension 50. Although no links 56 are shown between members 54 in product family level 64 and possible lower levels 52, the present invention contemplates such further levels 52 existing within product dimension 50 and analogous links 56 to reflect the corresponding hierarchical relationships. Furthermore, members 54 shown in FIG. 2A are exemplary only and are not intended to be an exhaustive set of all possible members 54. Those skilled in the art will appreciate that other suitable members 54 and associated links 56 may exist without departing from the intended scope of the present invention.

Previous dependent forecasting techniques rely on hierarchical relationships between members 54 to generate data forecasts for products corresponding to members 54. With previous techniques, deriving dependent demand forecasts or other dependent data involving source and target product members 54 that are not hierarchically related within product dimension 50 is relatively complicated, time consuming, and unreliable, making such techniques inadequate for many applications. The present invention allows dependent demand forecasts or other dependent data to be readily generated independent of hierarchical relationships that may or may not exist between subject source and target product members 54, providing an important technical advantage.

Dependent demand relationships between hierarchically unrelated members 54 are shown in FIG. 2A using dashed links 66. For example, link 66 between "6 GB" member 54 in family level 64 and "32 MB" member 54 also in family level 64 indicates a dependent demand relationship between "6 GB" member 54 and "32 MB" member 54. In this example, as indicated by the direction of the arrow on link 66, the demand for 32 MB memory boards (target product) is a function of the demand for 6 GB hard drives (source product) and may be expressed as a non-integer attach rate, since in this example 48 MB memory boards are also available. Similarly, link 66 between "6 GB" member 54 in family level 64 and "48 MB" member 54 also in family level 64 indicates a dependent demand relationship between these members 54. In this example, demand for 48 MB memory boards (target product) is also a function of the demand for 6 GB hard drives (source product) and may also be expressed as a non-integer attach rate. The attach rate data measures associated with such links 66 in database 16 may, in a particular example, reflect and wholly or partially quantify the business reality that more 32 MB memory boards than 48 MB memory boards are sold with 6 GB hard drives. In one embodiment, analogous links 66 might exist between "4 GB" member 54 in level 64 and "32 MB" and "48 MB" members 54 also in level 64. Links 66 such as these between members 54 within the same level 52 of product dimension 50 reflect what may be referred to as cousin-cousin or child-child dependent data relationships, depending on whether the members 54 have the same or a different parent member 54.

As another example of a cousin-cousin dependent data relationship, link 66 between "Home" member 54 in family level 64 and "233 MHz" member 54 in level 64 indicates a dependent demand relationship between these members 54. In this example, demand for 233 MHz CPUs (target product) is a function of demand for home versions of desktop computers (source product) and may be expressed as a non-integer attach rate, since in this example 300 MHz CPUs are assumed to be also available. Similarly, link 66 between "Student" member 54 in family level 64 and "233 MHz" member 54 indicates a dependent demand relationship between these members 54. In this example, demand for 233 MHz CPUs (target product) is also a function of the demand for student versions of desktop computers (source product) and may also be expressed as a non-integer attach rate. The attach rate data measures associated with these links 66 may, in a particular example, reflect and wholly or partially quantify the business reality that the number of 233 MHz CPUs required will depend on the number of desktop computers sold, both home and student versions, although the number of 233 MHz CPUs attributable to sales of home versions may be different than the number attributable to sales of student versions. In one embodiment, analogous links 66 might exist between "Home" and "Student" members 54 and "300 MHz" member 54.

Links 66 between "Executive" and "Student" members 54 (source products) and "Standard" and "Deluxe" members 54 (target products) provide further illustration of cousin-cousin dependent demand relationships of the type discussed above. Although non-hierarchical cousin-cousin relationships are discussed, the present invention readily accommodates any suitable dependent demand or other dependent data relationship. For example, the relationship between hierarchically unrelated members 54 residing in adjacent levels 52 may be referred to as a child-uncle relationship. The relationship between hierarchically unrelated members 54 residing in different but non-adjacent levels 52 may be referred to as a child-great uncle relationship. Those skilled in the art will appreciate that other dependent data relationships may exist between hierarchically unrelated members 54 in product dimension 50. As discussed more fully below, system 10 generates a dependent demand forecast or other dependent data for any target product member 54 within product dimension 50 as a function of corresponding independent data for any source product member 54 within product dimension 50, whether or not the source and target product members 54 are hierarchically related.

As discussed above, the data measures associated with each member 54 are an aggregation of the data measures associated with some or all members 54 in lower levels 52 within the same hierarchy of parent-child links 56. The aggregation is performed according to a selected aggregation function. In a more particular embodiment, at least independent and dependent data measures are fully summarizable or aggregatable for all levels 52 of product dimension 50. Suitable aggregation functions include, without limitation: (1) a sum function that sums demand associated with one or more members 54, (2) an average function that averages the demand associated with one or more members 54, (3) a median function that selects the median of demands associated with one or more members 54, (4) a minimum function that selects the minimum demand associated with one or more members 54, (5) a maximum function that selects the maximum demand associated with one or more members 54, (6) a mode function that determines the mode of demands associated with one or more members 54, (7) a standard deviation function that determines the standard deviation of demands associated with one or more members 54, (8) an appropriate conditional operator or binary operator, or (9) any other aggregation function. Data measures such as demand aggregate up at least some of the chain and disaggregate down at least some of the chain according to the selected aggregation function.

Figure 2B:
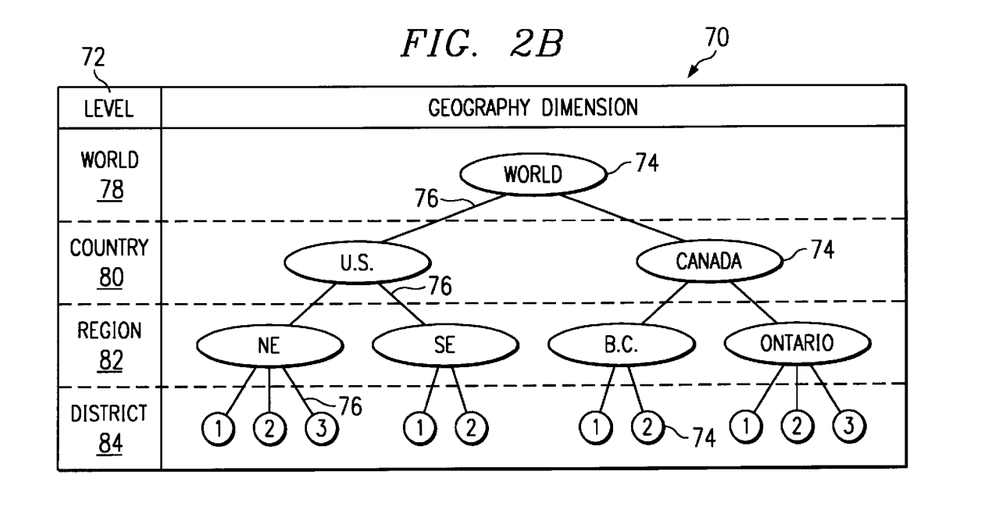

FIG. 2B illustrates an exemplary geography dimension 70 within database 16 that includes a hierarchy of geography levels 72 each having one or more members 74. The value of each data measure associated with a member 74 is an aggregation of the values of corresponding data measures associated with hierarchically related members 74 in lower levels 72 of geography dimension 70. In the exemplary embodiment in which system 10 provides dependent demand forecasts, the demand associated with a member 74 is the aggregate demand for these hierarchically related members 74. In this embodiment, geography levels 72 for geography dimension 70 include a world level 78, a country level 80, a region level 82, and a district level 84. Selected and merely exemplary hierarchical relationships between members 74 are shown using solid links 76, which are analogous to links 56 described above with reference to FIG. 2A. Although FIG. 2B is described primarily in connection with demand relationships, the following description is similarly applicable to other data relationships, such as available supply, selling price, or any other suitable relationships relating to one or more data measures associated with an item or set of items.

In the particular example illustrated in FIG. 2B, world level 78 contains "World" member 74 representing aggregate worldwide demand. Country level 80 contains "U.S." and "Canada" members 74, which represent aggregate demand for the United States and Canada, respectively. Link 76 between "U.S." members 74 in country level 80 and "World" members 74 in world level 78 indicates a hierarchical relationship between these members 74. Similarly, link 76 between "Canada" member 74 and "World" member 74 indicates a hierarchical relationship between these members 74. In this example, worldwide demand is an aggregation of aggregate demand in the United States as well as aggregate demand in Canada. Although other links 76 are not described in detail, those skilled in the art will appreciate that links 76 are analogous to links 56 described above with reference to FIG. 2A in that each represents a corresponding hierarchical relationship between members 74 in the various levels 72 of geography dimension 70. As discussed above, the present invention contemplates eliminating or otherwise not considering geography dimension 70 in generating dependent data, for example, if geography dimension 70 is not relevant to particular data forecasting needs. Database 16 might in this situation be two-dimensional.

Figure 3:
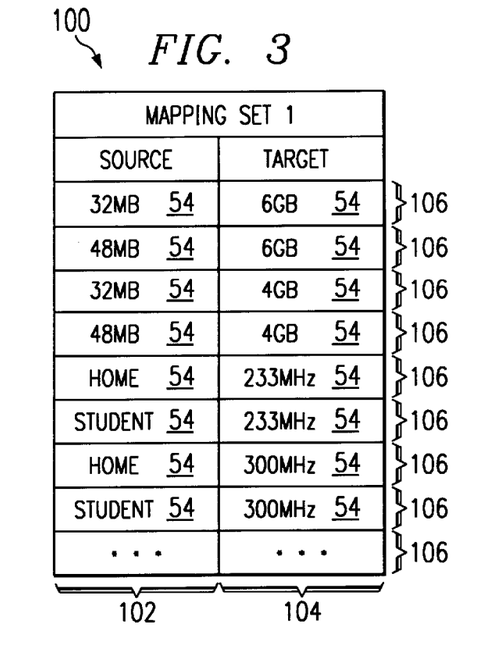
FIG. 3 illustrates an exemplary mapping set.

FIG. 3 illustrates an exemplary mapping set 100 corresponding to product dimension 50 shown in FIG. 2A, although mapping set 100 may be defined for any suitable relationship dimension. Mapping set 100 defines one or more mappings 106 between source members 54 in column 102 and target members 54 in column 104. Each mapping 106 reflects the dependent demand or other dependent data relationship between a pair of source and target members 54 and is independent of any hierarchical relationship that may or may not exist between the source and target members 54 in product dimension 50. For example, mapping 106 relating the dependent demand for 6 GB hard drives (target product) to demand for 32 MB memory boards (source product) contains hierarchically unrelated members 54. Similarly, mapping 106 relating the dependent demand for 6 GB hard drives (target product) to demand for 48 MB memory boards (source product) contains hierarchically unrelated members 54. As discussed above, the ability of system 10 to readily generate dependent demand forecasts or other dependent data concerning hierarchically unrelated members 54 provides an important technical advantage over previous techniques. In one embodiment, the collection of mappings 106 in mapping set 100 define a many-to-many relationship between source and target members 54. In one embodiment, mappings 106 are valid and invariant within database 16 across all geography members 74 in geography dimension 70 and all time intervals in the time dimension.

In one embodiment, administrator server 18 receives one or more mappings 106 and associated mapping sets 100 from administrator client 23 or a user associated with administrator client 23 and stores mapping sets 100 in database 16. Mapping sets 100 may be stored in database 16 individually or in a batch mode. Administrator server 18, database 16, or another component of system 10 may validate mapping sets 100 to ensure that source and target members 54 are defined in product dimension 50. In a particular embodiment, target members 54 for all mappings 106 within a particular mapping set 100 are from the same level 52 within product dimension 50, while source members 54 for mappings 106 within the particular mapping set 100 may be from multiple levels 52 within product dimension 50. Administrator server 18, database 16, or another suitable component of system 10 may also validate mapping sets 100 to ensure that any such requirement is satisfied. Relationship client 28 or a user associated with client 14 may update or otherwise modify mapping sets 100 as appropriate.

Figure 4:
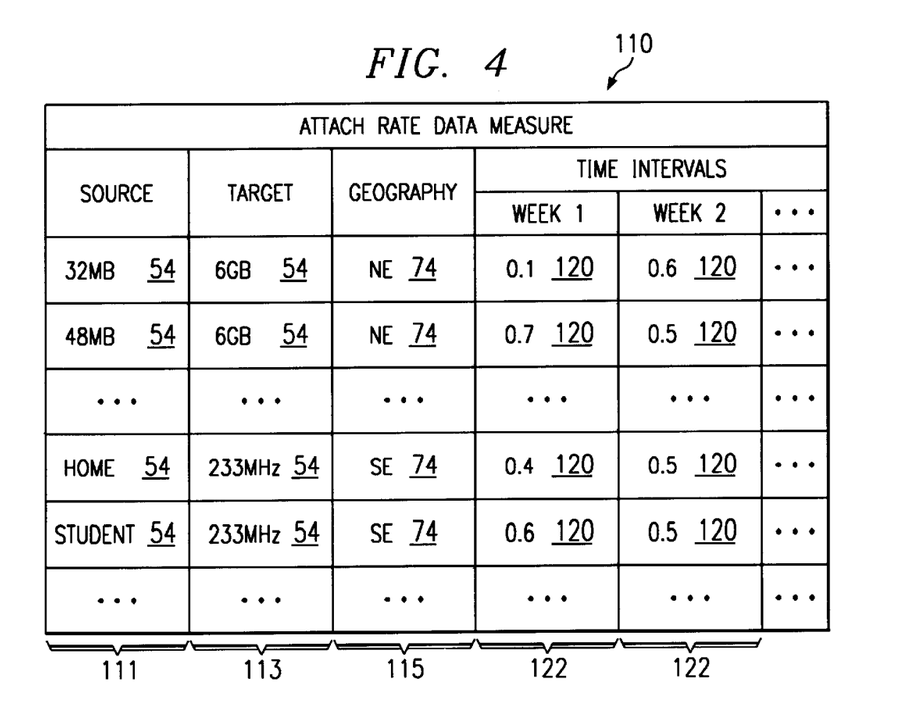
FIG. 4 illustrates an exemplary attach rate data measure.

FIG. 4 illustrates an exemplary attach rate data measure 110 having values or attach rates 120 that each correspond to particular mapping 106 of source and target members 54 in columns 111 and 113, respectively, a particular geography member 74 in column 115, and a particular time interval 122. Unlike values for some or all other data measures, attach rates 120 are keyed twice in product dimension 50, on both source and target members 54, and are non-summarizable or non-aggregatable within database 16. Keying attach rates 120 on both source and target members 54 contributes to the ability of system 10 to readily derive, update, and internally synchronize dependent demand or other dependent data concerning hierarchically unrelated source and target members 54, providing an important technical advantage over previous techniques.

As discussed above, attach rates 120 wholly or partially quantify the dependent data relationship between source and target members 54 for the given geography member 74 and time interval 122. For example, attach rate 120 equals "0.1" for "32 MB" source member 54, "6 GB" target member 54, "NE" geography member 74, and "Week 1" time interval 122, indicating that, according to a particular dependent data expression that specifies multiplication, dependent demand for 6 GB hard drives in the northeastern United States during the first week was equal to ten percent of the demand for 32 MB memory boards in the northeastern United States during the first week. Similarly, attach rate 120 equals "0.5" for "48 MB" source member 54, "6 GB" target member 54, "NE" geography member 74, and "Week 2" time interval 122, indicating that, according to a particular dependent data expression that specifies multiplication, dependent demand for 6 GB hard drives in the northeastern United States during the second week was equal to fifty percent of the demand for 48 MB memory boards in the northeastern United States during the second week.

Time intervals 122 may be days, weeks, months, quarters, years, or any other suitable time intervals 122. In one embodiment, it may be desirable to aggregate multiple time intervals 122, in which case data measures associated with time intervals 122, including attach rate data measure 110, are aggregated within database 16 accordingly. For example, if three time intervals 122 represent the first three months of a year, these time intervals 122 might be aggregated to generate a time interval 122 representing the first quarter of the year. Accordingly, attach rate data measure 110 might be averaged or otherwise aggregated over the three time intervals 122 to generate an attach rate 120 for the first quarter time interval 122. Time intervals 122 may be aggregated in any suitable manner using any suitable aggregation function for one or more corresponding data measures.

In one embodiment, administrator server 18 receives attach rates 120 from administrator client 23 or a user associated with administrator client 23 and stores attach rates 120 in database 16 individually or in a batch mode. Attach rates 120 may be defined subsequent to or essentially simultaneously with the definition of corresponding mappings 106. In one embodiment, attach rates 120 are forecasted quantities derived in a manner analogous to independent forecasts using traditional forecasting techniques. Although attach rates 120 are discussed as relating to product dimension 50, the present invention contemplates attach rates 120 in geography dimension 70, the time dimension, or any other appropriate dimension or dimensions. In one embodiment, any dimension with which attach rates 120 are associated may be referred to as a relationship dimension and dimensions with which attach rates 120 are not directly associated may be referred to as remaining dimensions. Relationship client 26 or a user associated with client 14 may update or otherwise modify attach rates 120 according to particular needs.

Figure 5:
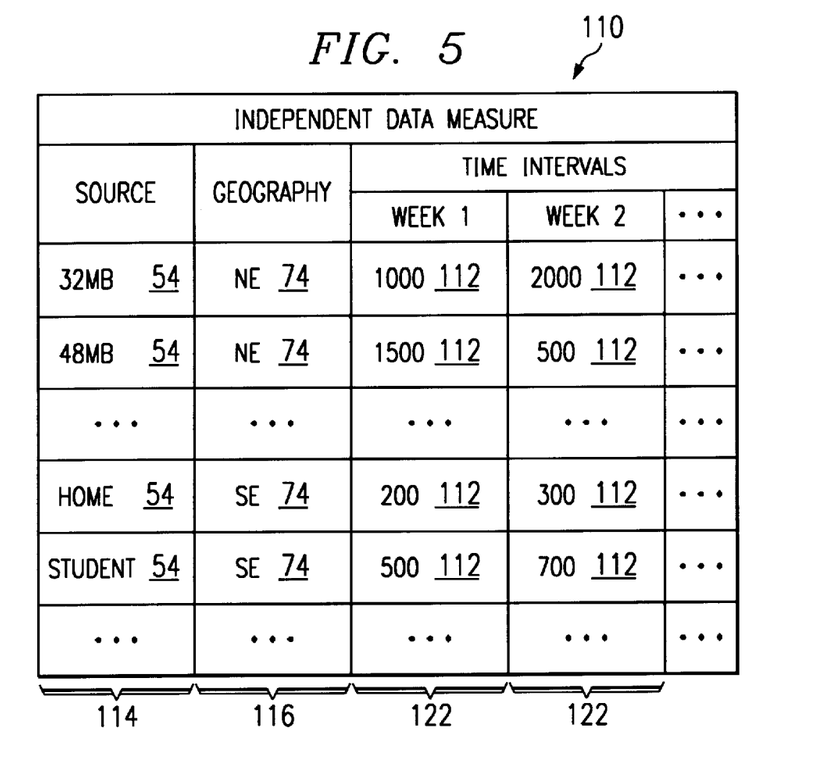
FIG. 5 is a table illustrating an exemplary independent data measure.

FIG. 5 is a table illustrating an exemplary independent data measure 118 having values 112 that each correspond to a particular combination of source product member 54 in column 114, geography member 74 in column 116, and time interval 122.

As a particular example, independent demand forecast 112 corresponding to "32 MB" source member 54, "NE" geography member 74, and "Week 1" time interval 122 may equal "1000" as indicated. In one embodiment, independent data measure values 112 are derived using traditional data forecasting techniques and information concerning the corresponding source products themselves. For example, independent demand forecasts 112 for a source product may be derived in a traditional manner for various geographies and times using suitable information concerning the source product such as historical sales, causal factors, key account input, market intelligence, and the like.

Planner client 28 may generate independent demand forecasts 112 based on input from a user or may receive independent demand forecasts 112 from the user in complete or substantially complete form. The values for independent data measure 110 may be generated in any suitable manner according to particular needs. Independent forecasts 112 may be aggregate independent forecasts 112. For example, if multiple independent demand forecasts 112 are derived using different methods or are received from different departments within an organization associated with system 10, it may be desirable to average or otherwise aggregate the individual independent forecasts 112 before deriving dependent demand forecasts. Relationship client 28 or a user associated with client 14 may update or otherwise modify independent forecasts 112 as appropriate.

Figure 6:
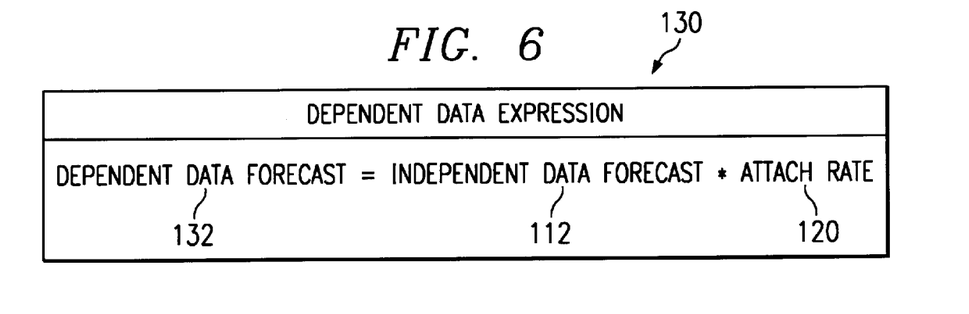
FIG. 6 illustrates an exemplary dependent data expression.

FIG. 6 illustrates an exemplary dependent data expression 130 reflecting the dependent relationship between target and source data measures. In this example, the source data measure is independent demand forecast 112 and the target data measure is a dependent demand forecast 132 derived by applying an attach rate 120 to independent demand forecast 112. Like independent demand forecast 112 and attach rate 120, the resulting dependent demand forecast 132 corresponds to a particular geography member 74 and a particular time interval 122. Unlike independent demand forecast 112, which is keyed on source member 54, and unlike attach rate 120, which is keyed on both source and target members 54, dependent demand forecast 132 is keyed on target member 54 in product dimension 50.

In a particular embodiment, as indicated in FIG. 6, independent forecast 112 is multiplied by attach rate 120 to generate dependent forecast 132, although any suitable expression, function, formula, or operator may be used according to particular needs. As a particular example, attach rate 120 might be a square root function that is applied by taking the square root of independent forecast 112 to generate dependent forecast 132. Other possible scenarios will be apparent to those skilled in the art, and the present invention is intended to encompass all such scenarios.

In one embodiment, relationship client 26 defines dependent data expression 130 based on input from a user associated with client 14. Once defined, dependent forecast expression 130 is communicated to planner server 22 for storage in database 16. Planner client 28 may perform some or all of the duties of relationship client 26 in creating, storing, and modifying dependent forecast expressions 130.

Figure 7:
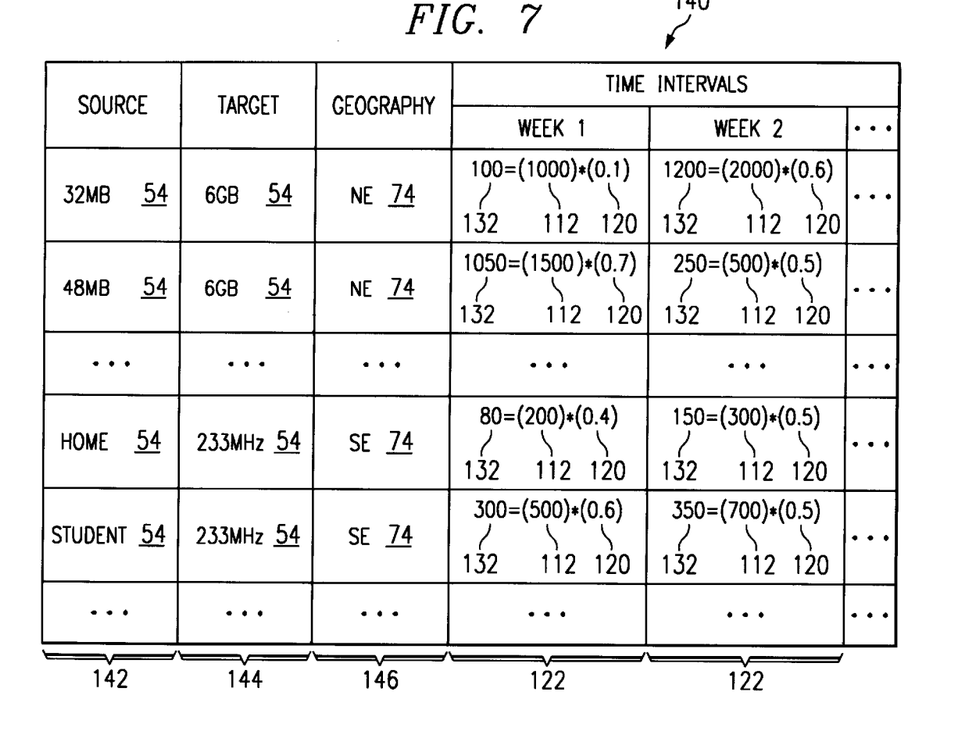
FIG. 7 is a table illustrating the exemplary application of a dependent data expression to generate dependent data.

FIG. 7 is a table 140 illustrating exemplary application of dependent data expression 130 to derive dependent forecasts 132 that each correspond to a particular mapping 106 of source and target members 54 in columns 142 and 144, respectively, a particular geography member 74 in column 146, and a particular time interval 122. For example, for mapping 106 of "32 MB" source member 54 and "6 GB" target member 54, "NE" geography member 74, and "Week 1" time interval 122, dependent demand forecast 132 equals "100" as a result of multiplying "1000" independent demand forecast 112 by "0.1" attach rate 120. In this example, the "0.1" value of attach rate 120 indicates that dependent demand for 6 GB hard drives in the northeastern United States during the first week was equal to ten percent of the independent demand for 32 MB memory boards in the northeastern United States during the first week. As discussed above with reference to FIG. 6, application of attach rate 120 to independent forecast 112 may be other than a multiplication of independent forecast 112 by attach rate 120.

Figure 8:
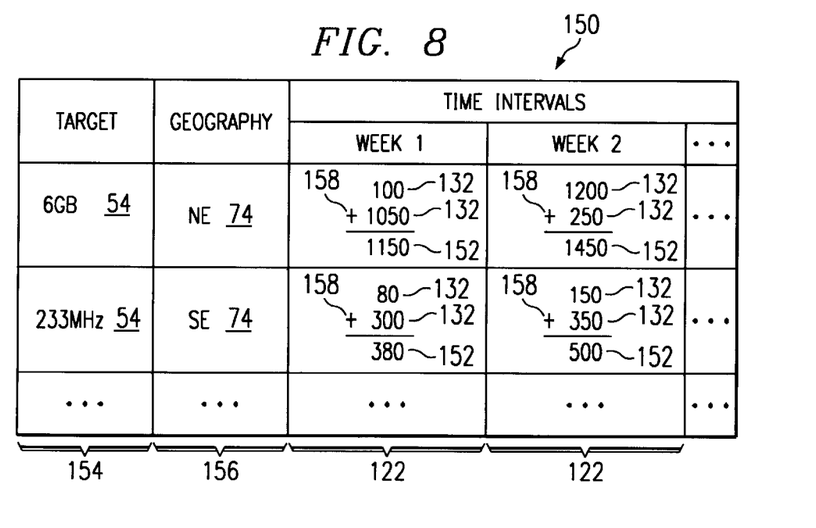
FIG. 8 is a table illustrating the exemplary application of an aggregation function to generate aggregate dependent data.

FIG. 8 is a table 150 illustrating application of an exemplary aggregation function 158 to dependent data forecasts 132 to derive one or more aggregate dependent data forecasts 152, each corresponding to a particular target member 54 in column 154, a particular geography member 74 in column 156, and a particular time interval 122. Although the sum aggregation function 158 is illustrated in FIG. 8, aggregation function 158 may be any one of the sum, average, mean, minimum, maximum, mode, and standard deviation functions discussed above or any other suitable aggregation function 158. Aggregate dependent forecasts 152 reflects and quantify the business reality that, to take a particular example illustrated in FIG. 8, demand for 6 GB hard drives is driven by demand for both 32 MB and 48 MB memory boards and may be aggregated accordingly. Aggregate dependent forecasts 152 are keyed on target members 54 within product dimension 50 and may themselves be aggregated as appropriate over multiple time intervals 122 in a manner similar to that discussed above in connection with the aggregation of dependent forecasts 132 over multiple time intervals 122.

An attach rate relationship is defined according to a particular corresponding mapping set 100, a particular corresponding dependent data expression 130 that may be applied to each mapping 106 in the mapping set 100, and a particular corresponding aggregation function 158 that may be used to derive aggregate dependent forecasts 152 from dependent forecasts 132. In operation of system 10, a user may specify a desired geography member 74 and one or more desired time intervals 122 to access dependent data forecasts 132 and aggregate dependent data forecasts 152 corresponding to the specified geography member 74 and time intervals 122. System 10 is able to readily generate such dependent data as a result of, among other things, mappings 106 and the fact that attach rate data measure 110 is keyed at both source and target members 54 in product dimension 50.

Figure 9A:
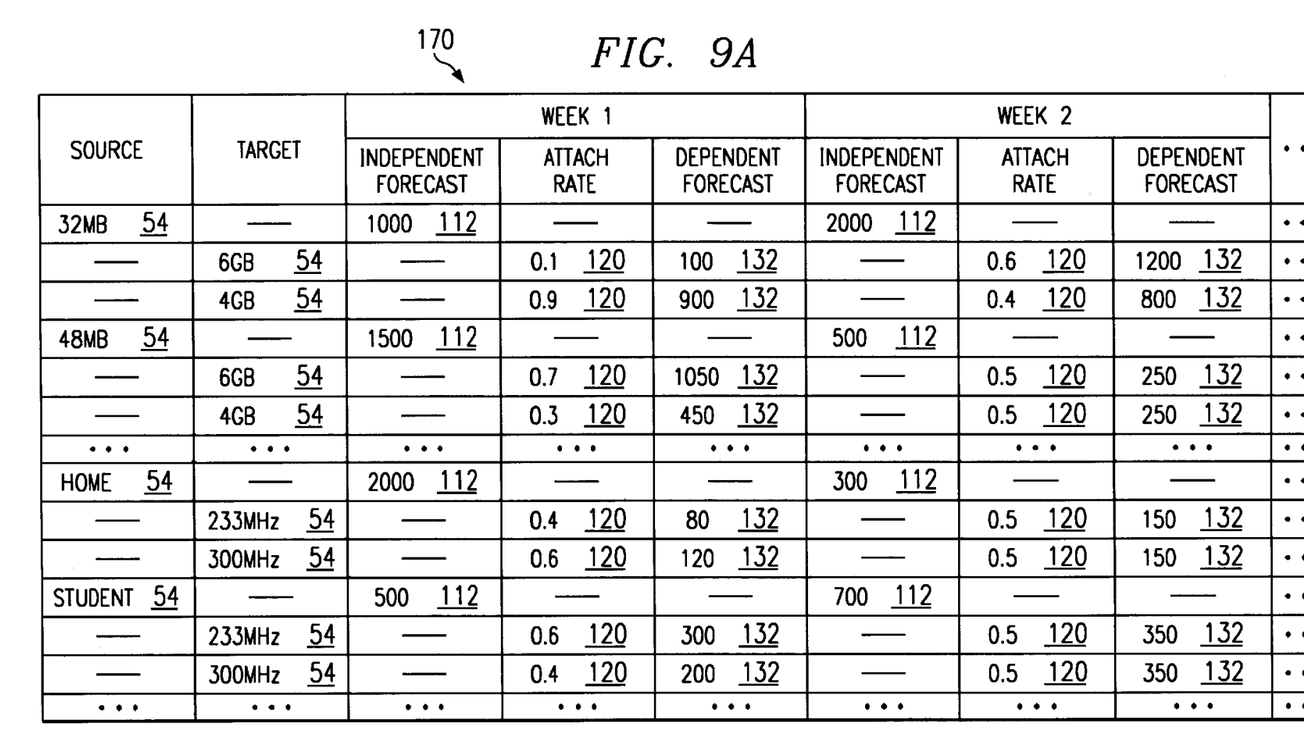
FIGS. 9A and 9B illustrate exemplary spreadsheets for providing dependent data to a user.
Figure 9B:
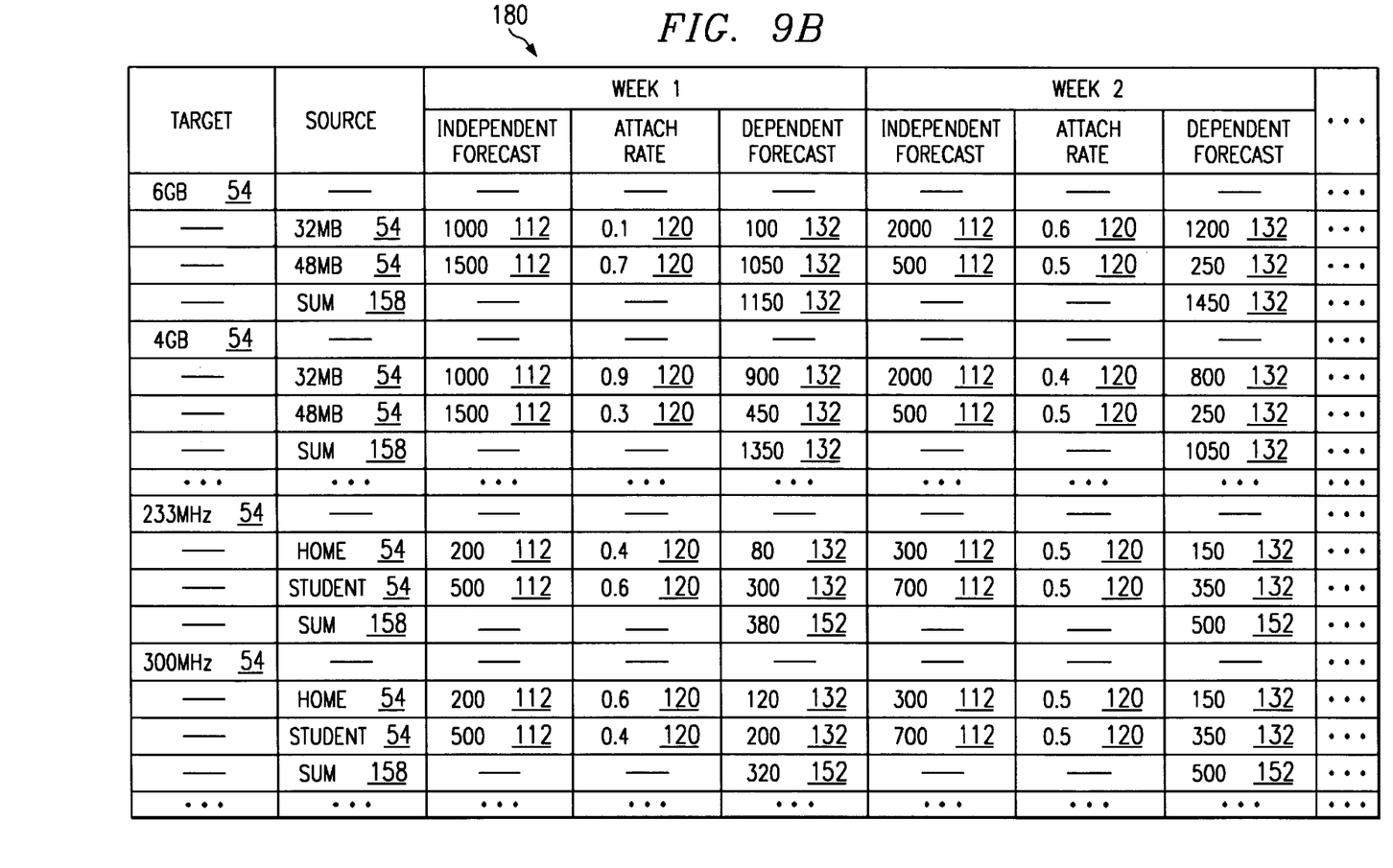

FIGS. 9A and 9B illustrate merely exemplary spreadsheets 170 and 180, respectively, for providing dependent data forecasts 132 and aggregate dependent data forecasts 152 to a user of system 10, using output device 38 of computer 34 or otherwise. Referring to FIG. 9A, spreadsheet 170 is in source product format, in which one or more data measures for all target members 54 relating to a particular source member 54 are grouped, for the specified geography data item 74 and time interval 122. In one embodiment, data measures presented in spreadsheet 170 include dependent forecasts 132, each of which is associated with a storage location 42 in database 16 particular to the corresponding combination of target member 54, geography member 74, and time interval 122. Dependent data forecasts 132 may be for data measures such as unit shipping, unit sales, inventory, and other suitable data measures used to derive the corresponding independent data forecasts 112. In one embodiment, spreadsheet 170 is presented to the user graphically in response to a user command and provides a bill of material (BOM) explosion corresponding to a user-specified combination of a particular source member 54, a particular geography member 74, and one or more particular time intervals 122.

Relationship client 26 or a user of system 10 may use spreadsheet 170 and input device 36 of computer 34 to accomplish the following, without limitation: (1) modify one or more independent forecasts 112; (2) modify one or more dependent data expressions 130; (3) modify one or more attach rates 120; (4) modify one or more dependent forecasts 132; (5) modify one or more aggregation functions; (6) specify a different combination of source member 54, geography member 54, and one or more time intervals 122; or (7) modify any other suitable parameter associated with a particular storage location 42 in database 16. Upon receiving such input, server 14 updates and internally synchronizes data measures at some or all applicable storage locations 42 within database 16, which may involve aggregation or disaggregation as appropriate within product dimension 50 and geography dimension 70. In one embodiment, internal synchronization of database 16 is accomplished without some or all of the complicated additional data processing associated with previous dependent data generation techniques. As a result, using the present invention, data measures are internally consistent and more readily available to and reliably used by multiple users sharing the resources of system 10. Modification and internal synchronization with respect to one or more data measures may occur serially, substantially simultaneously, or in any other suitable manner.

Referring to FIG. 9B, spreadsheet 180 is in target product format, in which one or more data measures for all source members 54 relating to a particular target member 54 are grouped, for the specified geography member 74 and time interval 122. In one embodiment, data measures presented in spreadsheet 180 include dependent data forecasts 132 and aggregate dependent data forecasts 152, each of which is associated with a particular storage location 42 in database 16 for the corresponding combination of target member 54, geography member 74, and time interval 122. Modifications as described above with reference to FIG. 9A may be input using spreadsheet 180.

Although in this particular example the sum aggregation function 158 is specified, any suitable aggregation function 158 may be used to derive aggregate dependent forecasts 152 according to particular needs.

Figure 10:
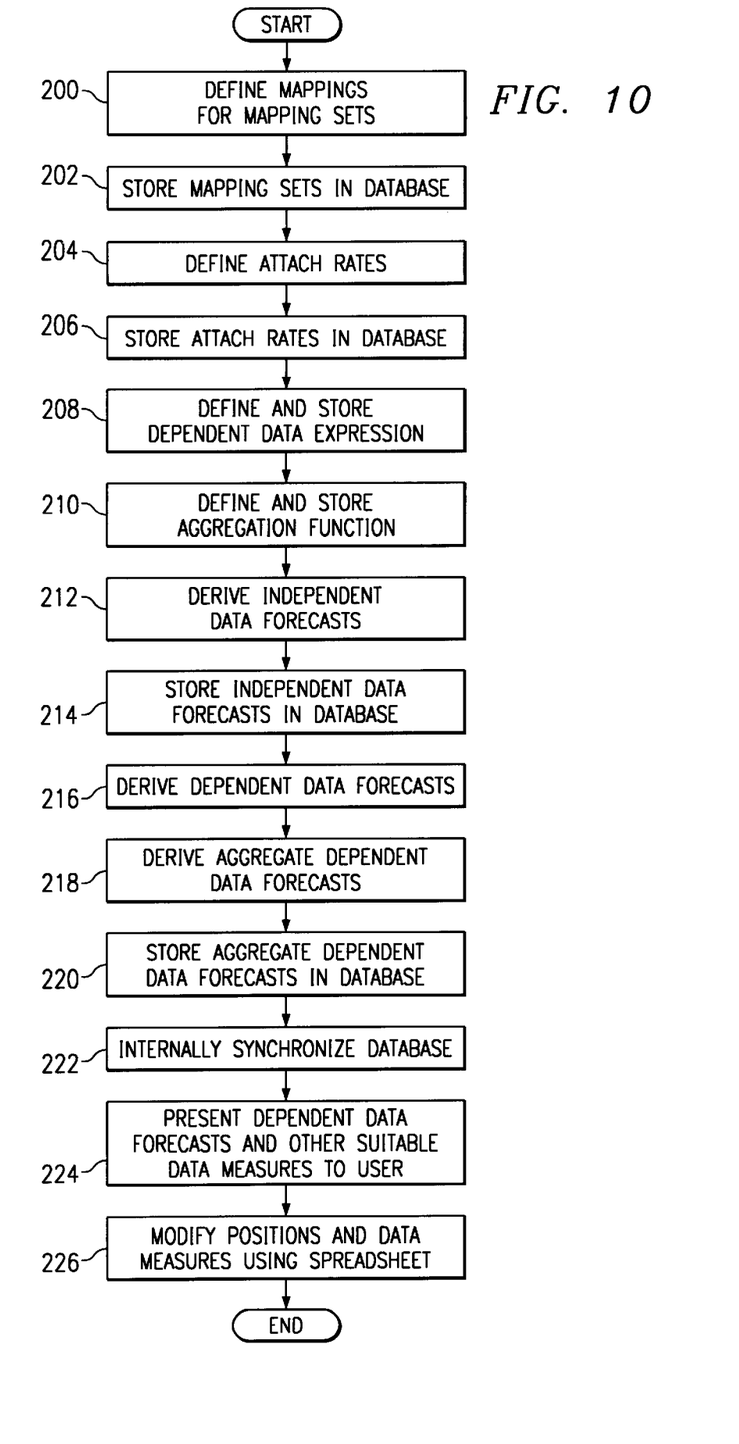
FIG. 10 is a flowchart illustrating an exemplary method of generating dependent data.

FIG. 10 is a flowchart illustrating an exemplary method of generating dependent data according to the present invention. The method is described assuming that the product, geography, and time dimensions of database 16 are properly configured and that database 16 is populated with appropriate data measures. It is also assumed that all appropriate processes of server 12 and client 14 are initialized. The method begins at step 200, where mappings 106 for one or more mapping sets 100 are defined using administrator server 18 or other suitable component of system 10. For each mapping 106, step 200 includes identifying corresponding source and target members 54 from product dimension 50. In one embodiment, as discussed more fully above with reference to FIG. 3, target members 54 for all mappings 106 within a particular mapping set 100 are from the same level 52 within product dimension 50. Administrator server 18 stores one or more mapping sets 100, each containing one or more mappings 106, in database 16 at step 202.

At step 204, one or more attach rates 120 are defined using administrator server 18, each attach rate 120 corresponding to a particular source and target members 54 for mapping 106, a particular geography member 74, and a particular time interval 122. Administrator server 18 stores attach rates 120 in database 16 at step 206. Steps 204 and 206 may be wholly or partially integral to steps 200 and 202. At step 208, one or more dependent forecast expressions 130 are defined using relationship client 26, planner server 22, or any other appropriate components of system 10. At step 210, a suitable aggregation function 158, such as sum aggregation function 158, is specified and stored in database 16.

At step 212, independent demand or other independent data forecasts 112 are derived for source members 54 within product dimension 50 using traditional data forecasting techniques and, at step 214, are stored in database 16. The steps of deriving and storing independent forecasts 112 may be wholly or partially integral to the initial population of database 16 with data measures. Each independent forecast 112 is stored in a particular storage location 42 in database 16 corresponding to a particular source member 54, a particular geography member 74, and a particular time interval 122. At step 216, planner server 22 and database 16 cooperate to generate, using dependent data expression 130, dependent forecasts 132 that each correspond to a particular target member 54, a particular geography member 74, and a particular time interval 122. As discussed more fully above, in a particular embodiment each dependent forecast 132 is generated by multiplying a corresponding independent forecast 112 by a corresponding attach rate 120.

At step 218, planner server 22 and database 16 cooperate to derive, according to aggregation function 158, aggregate dependent data forecasts 152 that each correspond to a particular target member 54, a particular geography member 74, and a particular time interval 122. Planner server 22 cooperates with database 16 to store aggregate dependent data forecasts 152 in database 16 at step 220 and, at step 222, planner server 22 and any other appropriate components of system 10 cooperate with database 16 to internally synchronize some or all data measures in database 16. At step 224, system 10 presents dependent forecasts 132, aggregate dependent forecasts 152, and other appropriate data measures to a user of system 10 using spreadsheet 170, spreadsheet 180, or in any other suitable format. As discussed more fully above with reference to FIGS. 9A and 9B, the user may modify positions within one or more dimensions and may modify one or more data measures according to particular needs at step 226 using spreadsheet 170, spreadsheet 180, or in any other suitable manner.

The present invention contemplates performing the following at step 226 or at any other time during operation of system 10, without limitation: (1) redefining, defining additional, or otherwise modifying the collection and arrangement of product members 54, geography members 74, or time intervals 122, singly or in any combination; (2) repopulating database 16, populating database 16 with additional data measures, or otherwise modifying the collection of data measures in database 16; (3) redefining, defining additional, or otherwise modifying mappings 106 and mapping sets 100; (4) redefining, defining additional, or otherwise modifying one or more attach rates 120; (5) redefining, defining additional, or otherwise modifying one or more dependent forecast expressions 130; (6) rederiving, deriving additional, or otherwise modifying one or more independent forecasts 112; (7) redefining, defining additional, or otherwise modifying aggregation function 158; or (8) and other suitable modification. The method iterates, in whole or in part, until no further activity is desired, and the method ends.

Although the present invention has been described with several embodiments, a plethora of changes, substitutions, variations, alterations, and modifications may be suggested to one skilled in the art, and it is intended that the present invention encompass such changes, substitutions, variations, alterations, and modifications as fall within the spirit and scope of the appended claims.

What is claimed is:

1. A system for generating dependent data, comprising:
a database having at least a first dimension, the first dimension comprising a plurality of members, each member being hierarchically related to at least one other member, the database containing:
 a mapping comprising a source member in the first dimension and a target member in the first dimension; and
 an attach rate quantifying a dependent data relationship between independent data associated with the source member and dependent data associated with the target member; and
a server coupled to the database and operable to access the mapping, the server further operable to apply the attach rate to the independent data for the source member to generate the dependent data for the target member.

2. The system of claim 1, wherein:
the first dimension is a product dimension; and
the database further contains a member in a time dimension, the attach rate relating the independent data to the dependent data given the member in the time dimension.

3. The system of claim 2, wherein the database further contains a member in a geography dimension, the attach rate relating the independent data to the dependent data given the members in the time and geography dimensions.

4. The system of claim 1, wherein:
the independent data for the source member is associated with demand for a corresponding source item; and
the dependent data for the target member is associated with dependant demand for a corresponding target item.

5. The system of claim 1, wherein the database contains a mapping set that comprises:
the mapping; and
a second mapping, the second mapping comprising a second source member in the first dimension and the target member.

6. The system of claim 1, wherein the database contains a mapping set that comprises:
the mapping; and
a second mapping, the second mapping comprising the source member and a second target member in the first dimension.

7. The system of claim 1, wherein the server applies the attach rate to the independent data according to a dependent data expression specifying an independent data measure, an attach rate data measure, and an operator.

8. The system of claim 7, wherein the operator is a multiplier, the server multiplying the independent data for the source member by the attach rate to generate the dependent data for the target member.

9. The system of claim 1, wherein the source member and the target member are hierarchically unrelated in the first dimension.

10. The system of claim 1, wherein the server is operable to generate second dependent data for the target member using independent data for a second source member, the server further operable to aggregate the dependent data and the second dependent data to generate aggregate dependent data for the target member.

11. The system of claim 10, wherein the server generates the aggregate dependent data according to a sum aggregation function.

12. The system of claim 1, further comprising a client coupled to the server and operable to specify:
a mapping set comprising a plurality of mappings, each mapping comprising one of a plurality of source members and one of a plurality of target members in the first dimension;
a dependent data expression specifying an independent data measure, an attach rate data measure, and an operator; and
an aggregation function, the server operable to receive identities of the mapping set, the dependent data expression, and the aggregation function from the client, the server further operable to generate aggregate dependent data for each target member in the mapping set according to the identities.

13. A data structure embodied in a computer-readable medium, the data structure comprising:
at least one attach rate quantifying a dependent data relationship between independent data associated with a source member in a first dimension of a database and dependent data associated with a target member in the first dimension of the database; and
the attach rate capable of being applied based on a mapping of the source member and the target member, to the independent data for the source member to generate dependent data for the target item.

14. The attach rate of claim 13, wherein:
the first dimension is a product dimension; and
the database further has a second time dimension, the attach rate relating the independent data to the dependent data given the member in the time dimension.

15. The attach rate of claim 14, wherein the database has a third geography dimension, the attach rate relating the independent data to the dependent data given the members in the time and geography dimensions.

16. The attach rate of claim 13, wherein:
the independent data for the source member is associated with forecasted demand for a corresponding source item; and the dependent data for the target member is associated with forecasted dependent demand for a corresponding target item.

17. The attach rate of claim 13, wherein the attach rate is one instance of an attach rate data measure.

18. The attach rate of claim 13, wherein the source member and the target member are not hierarchically related in the first dimension.

19. A method for generating dependent data, comprising:

storing within a database having at least a first dimension, the first dimension comprising a plurality of members, each member being hierarchically related to at least one other member:

a mapping comprising a source member in a first dimension and a target member in a first dimension; and an attach rate quantifying a dependent data relationship between independent data associated with the source member and dependent data associated with the target member; and applying the attach rate to the independent data for the source member at a server coupled to the database to generate the dependent data for the target member.

20. The method of claim 19, wherein:

the first dimension is a product dimension; and the method further comprises storing in the database a member in a time dimension, the attach rate relating the independent data to the dependent data given the member in the time dimension.

21. The method of claim 20, further comprising storing in the database a member in a geography dimension, the attach rate relating the independent data to the dependent data given the members in the time and geography dimensions.

22. The method of claim 19, wherein:

the independent data for the source member is associated with demand for a corresponding source item; and the dependent data for the target member is associated with dependent demand for a corresponding target item.

23. The method of claim 19, further comprising storing in the database a mapping set that comprises:

the mapping; and a second mapping, the second mapping comprising a second source member in the first dimension and the target member.

24. The method of claim 19, further comprising storing in the database a mapping set that comprises:

the mapping; and a second mapping, the second mapping comprising the source member and a second target member in the first dimension.

25. The method of claim 19, wherein applying the attach rate comprises applying the attach rate to the independent data according to a dependent data expression that specifies an independent data measure, an attach rate data measure, and an operator.

26. The method of claim 19, wherein the operator is a multiplier, the server multiplying the independent data for the source member by the attach rate to generate the dependent data for the target member.

27. The method of claim 19, wherein the source member and the target member are hierarchically unrelated in the first dimension.

28. The method of claim 19, further comprising:

generating second dependent data for the target member using independent data for a second source member; and aggregating the dependent data and the second dependent data to generate aggregate dependent data for the target member.

29. The method of claim 28, wherein aggregating comprises aggregating according to a sum aggregation function.

30. The method of claim 19, further comprising:

specifying, at a client coupled to the server, a mapping set comprising a plurality of mappings, each mapping comprising one of a plurality of source members and one of a plurality of target members in the first dimension;

specifying, at the client, a dependent data expression specifying an independent data measure, an attach rate data measure, and an operator;

specifying, at the client, an aggregation function;

receiving identities of the mapping set, the dependent data expression, and the aggregation function; and generating aggregate dependent data for each target member in the mapping set according to the identities.

* * * * *